(12) United States Patent
Kweeder et al.

(10) Patent No.: US 8,814,977 B2
(45) Date of Patent: Aug. 26, 2014

(54) STABILIZED COMPOSITIONS COMPRISING AMMONIUM NITRATE

(75) Inventors: James A. Kweeder, Morristown, NJ (US); Richard J. Williams, Morristown, NJ (US)

(73) Assignee: Honeywell International Inc., Morristown, NJ (US)

(*) Notice: Subject to any disclaimer, the term of this patent is extended or adjusted under 35 U.S.C. 154(b) by 326 days.

(21) Appl. No.: 13/289,700

(22) Filed: Nov. 4, 2011

(65) Prior Publication Data

US 2012/0180538 A1 Jul. 19, 2012

Related U.S. Application Data

(63) Continuation of application No. 11/622,878, filed on Jan. 12, 2007, now Pat. No. 8,075,660.

(60) Provisional application No. 60/758,642, filed on Jan. 13, 2006.

(51) Int. Cl.
| | |
|---|---|
| *C05B 7/00* | (2006.01) |
| *C05C 5/02* | (2006.01) |
| *C01C 1/22* | (2006.01) |
| *C05C 3/00* | (2006.01) |
| *C05C 1/00* | (2006.01) |
| *C05C 1/02* | (2006.01) |

(52) U.S. Cl.
CPC ..................................... *C05C 1/02* (2013.01)
USPC ................ 71/33; 71/34; 71/50; 71/53; 71/58; 71/59; 71/60; 423/396

(58) Field of Classification Search
CPC ................. C05C 1/00; C05C 5/02; C05C 5/04
USPC .......... 71/31–36, 61, 58; 149/46, 47; 423/396
See application file for complete search history.

(56) References Cited

U.S. PATENT DOCUMENTS

| | | | | |
|---|---|---|---|---|
| 2,061,191 | A | * | 11/1936 | Foss et al. ...................... 423/143 |
| 3,173,756 | A | | 3/1965 | Griffith |
| 3,241,947 | A | | 3/1966 | Young |
| 3,366,468 | A | | 1/1968 | Porter |
| 4,124,368 | A | * | 11/1978 | Boyars ............................... 71/59 |
| 4,481,048 | A | | 11/1984 | Cady et al. |
| 4,486,396 | A | * | 12/1984 | Kjohl et al. .................... 423/265 |
| 6,669,753 | B1 | | 12/2003 | Chambers et al. |
| 6,689,181 | B2 | | 2/2004 | Highsmith et al. |
| 2002/0095966 | A1 | | 7/2002 | Highsmith |

FOREIGN PATENT DOCUMENTS

| | | |
|---|---|---|
| CN | 1704386 | 12/2005 |
| RU | 2223934 C1 | 2/2004 |
| RU | 2237046 C1 | 9/2004 |
| WO | WO97/14665 A1 | 4/1997 |
| WO | WO97/14865 A2 | 4/1997 |
| WO | WO02/40427 A2 | 5/2002 |

OTHER PUBLICATIONS

Corresponding Japanese Patent Application No. 2008-550551 (translation), dated Jul. 29, 2013—enclosing record of prior art search result.
Ando, Junpei, et al., Compounds in Mixed Nitrate Fertilizers and their Behavior, The Chemical Society of Japan, 1994, No. 9, pp. 1617-1622.
Forsyth, J.B, Comparison of Two Sources of Nitrogen for Peach Trees, The Agricultural Gazette of New South Wales, 1971, vol. 82, pp. 227-229.
Roy, A.K, et al., A Method for Direct Estimation of Calcium Nitrate in Calcium Ammonium Nitrate Fertilizer, Technology, 1964, vol. 1, No. 3, pp. 31-32.
Fiedler, Linde, et al., Nitrogen Form and Nitrogen Increase Trial, Albrecht Thaer Archly, 1964, Vo.l. 8, Book 8/9, pp. 649-673.
McClellan, G.H., et al., Crystallography of $(NH_4)_3SiF_6NO_3-$, J. Appl. Cryst., 1969, vol. 2, pp. 305-306.
Potekhin, V.A., et al., Solubility in the System Water Potassium Nitrate Ammonium Nitrate, J. Inorganic Chem., 1968, vol. 13, No. 10, pp. 2848-2850.
Malquori A., et al., Contribution to the knowledge of complex fertilizing components, La Chimica e l'industria, 1964, vol. 46, No. 6, pp. 637-647.

* cited by examiner

*Primary Examiner* — Wayne Langel
*Assistant Examiner* — Syed Iqbal
(74) *Attorney, Agent, or Firm* — Faegre Baker Daniels LLP

(57) ABSTRACT

Preferred aspects of the present invention provide ammonium nitrate compositions comprising ammonium nitrate and at least one stabilizing agent, and preferably a third compound. In certain preferred embodiments, the stabilizing agent, together with third compound, is present under conditions and in amounts effective to substantially reduce the detonation sensitivity of the composition and/or to otherwise improve a desired property of the composition.

20 Claims, No Drawings

STABILIZED COMPOSITIONS COMPRISING AMMONIUM NITRATE

CROSS-REFERENCES TO RELATED APPLICATIONS

This application is a continuation of U.S. patent application Ser. No. 11/622,878, filed on Jan. 12, 2007, which claims the benefit of U.S. provisional application No. 60/758,642 filed Jan. 13, 2006 both of which are incorporated by reference in their entirety.

FIELD OF THE INVENTION

The present invention relates to ammonium nitrate compositions, and more particularly to stabilized or desensitized compositions containing ammonium nitrate, as well as processes for producing same. The compositions of the present invention are generally useful as fertilizers and preferably have desirable levels of nitrate ions and relatively high resistance to detonation.

BACKGROUND OF THE INVENTION

It is well known that, because of its high concentration of nitrate ions, ammonium nitrate has important uses in the field of agriculture in general and fertilization in particular. However, it is also well known that ammonium nitrate, in many of the forms in which it has heretofore been commonly used, is relatively difficult and potentially hazardous to handle commercially in large amounts, and/or to store in great masses (such as occur in commercial warehouses and storage bins), especially for relatively long periods of time. Furthermore, it has been known that many of the forms of ammonium nitrate heretofore commonly used have had a tendency to detonate under relatively mild conditions, and have therefore sometimes been abused and misused as an explosive material.

Several potential solutions to the problem of the explosiveness and/or the detonability of compositions containing ammonium nitrate have been proposed. For example, the use of ammonium nitrate in the form of a double salt with ammonium sulfate for the purpose of reducing the hazardous properties of the ammonium nitrate has been suggested in U.S. Pat. No. 6,689,181, which is incorporated herein by reference. On the other hand, the use of ammonium nitrate in the form of a double salt diethylenetriamine trinitrate has been suggested for use because of its increased explosive properties and detonation tendencies. See, for example, U.S. Pat. No. 4,481,048. Thus, it is difficult to predict in advance with any degree of precision what impact, if any, a particular form of ammonium nitrate, particularly ammonium nitrate in the form of a double salt, will have on the explosive properties of the material or the tendency of the material to detonate. Thus, while the aforementioned solutions and other solutions have provided improved results at least in some circumstances, applicants have come to recognize that a substantial and unexpected advantage can be achieved by incorporating certain materials or agents into such compositions and similar compositions. Moreover, applicants have come to appreciate that certain stabilizing agents which might otherwise be considered for use in connection with compositions, and in particular fertilizer compositions, may have a detrimental effect on the characteristics of the composition for its independent purpose. For example, certain compositions may not be as effective as desired with respect to providing nutrition and/or other beneficial ingredients to the soil or to the plant life therein.

DESCRIPTION OF PREFERRED EMBODIMENTS OF THE INVENTION

Preferred aspects of the present invention provide compositions comprising ammonium nitrate and at least one stabilizing agent. As the term is used herein, "ammonium nitrate" is intended to mean and encompass within its scope ammonium nitrate in any of its forms, including as free ammonium nitrate and ammonium nitrate in the form of any one of the salts it is capable of forming, including the double salt formulations disclosed in U.S. Pat. No. 6,689,181 and our copending provisional application 60/758,652 and the corresponding regular application filed concurrently and identified by each of which is incorporated herein by reference. It is preferred that the stabilizing agent, which is sometimes referred to also as a desensitized in agent, is present under conditions and in amounts effective to substantially reduce the detonation sensitivity of the composition and/or to otherwise improve a desired property of the composition, and also preferably at the same time not having a substantial negative effect on the use or the properties of the compositions, particularly the usefulness of fertilizer compositions for their intended purpose.

In certain preferred embodiments of the present invention, the present compositions include, in addition to the ammonium nitrate and stabilizing agent, a third component selected from the group consisting of ammonium sulfate, ammonium phosphate, calcium nitrate, potassium nitrate, magnesium nitrate, ammonium molybdenate, ammonium hexafloural-silicate, neodymium hydroxynitrate, and combinations of two or more of these. In preferred embodiments, at least a substantial portion of the ammonium nitrate in the composition is in the form of a double salt with one or more of said third compounds or components. In highly preferred embodiments, the present compositions consist essentially of one or more double salts of ammonium nitrate and a stabilizing agent in accordance with the present invention.

Another aspect of the present invention provides methods for reducing the sensitivity to detonation of compositions containing ammonium nitrate by including in such compositions one or more additional compounds effective to substantially reduce or maintain at a low level the detonation sensitivity of the composition. According to certain preferred embodiments, the compositions and methods produce reduced sensitivity to detonation as measured by at least one, and preferably both of: a) increase in onset temperature; or b) increase in DTA heating rate, each relative to the value for same exhibited by ammonium sulfate nitrate 2:1 double salt (2:1 ASN).

For example, a Thermal Gravimetric Analyzer (TGA), model number RT6220 sold by Seiko Instruments has been used to evaluate both the single salt AN and 2:1 ASN for onset temperature, weight loss (to indicate the presence of a reaction), and the approximate peak drop in heating rate. Those skilled in the art will appreciate that the particular results reported here for these materials, while being generally indicative of the properties of the these materials, are used herein primarily for comparison purposes to illustrate the relative performance improvement achieved by compositions and methods of the present invention.

| Sample | Onset (C.) | Loss (wt. %) | DTA (uV) |
|---|---|---|---|
| 2:1 ASN | 222.4 | 38.3 | 2.29 |
| | 222.9 | 41.5 | 2.08 |

-continued

| Sample | Onset (C.) | Loss (wt. %) | DTA (uV) |
|---|---|---|---|
|  | 222.4 | 39.5 | 1.12 |
|  | 220.7 | 38.8 | 1.74 |
|  | 224.1 | 41.2 | 1.44 |
|  | 223.2 | 39.6 | 1.30 |
|  | 223.5 | 38.4 | 2.10 |
| 2:1 ASN Average | 222.7 | 39.6 | 1.72 |
| 2:1 ASN Standard Deviation | 1.1 | 1.3 | 0.45 |

In certain preferred embodiments, the compositions and methods of the present invention produce an onset temperature, preferably as measured in accordance with know use of the TGA Model number RT6220 sold by Seiko Instruments, that is not substantially below about the onset temperature of 2:1 ASN, and more preferably at least about 1° C. above the onset temperature of 2:1 ASN. In certain preferred embodiments, the onset temperature of the present compositions is at least about 220° C., and more preferably at least about 223° C.

In certain preferred embodiments, the compositions and methods of the present invention produce a peak drop in heating rate (PDHR), preferably as measured by differential thermal analysis (DTA) in accordance with know use of the TGA Model No. RT6220 sold by Seiko Instruments, that is not substantially below about the PDHR of 2:1 ASN, more preferably at least about 15 relative percent greater, and even more preferably at least about 50 relative percent greater than the PDHR of 2:1 ASN. In certain preferred embodiments, the compositions and methods of the present invention produce a peak drop in heating rate (PDHR), preferably as measured by differential thermal analysis (DTA) in accordance with know use of the TGA Model No. RT6220 sold by Seiko Instruments, that is at least about 0.5 uV greater than, more preferably at least about 1 uV greater than, and even more preferably at least about 2 uV greater than the PDHR of 2:1 ASN.

Although it is contemplated that numerous stabilizing agents can have the beneficial results, and particularly the unexpected and highly desirable beneficial results described above, it is nevertheless generally preferred that the compositions of the present invention include a stabilizing agent which is characterized as having a tendency to suppress the decomposition tendency of the composition. In preferred embodiments, such stabilizing agent comprises at least one compound selected from the group consisting deoxidants (including those which combine with and prevent further oxidation of ammonia), and ammonium generating agents.

Examples of stabilizing agents which are contemplated for use in connection with the present invention, either alone or in combination with other agents in the following list or other agents not mentioned here, include: active silica, magnesium nitrate, magnesium sulfate, potassium chloride, calcium carbonate, magnesium carbonate, water, dolomite, oxalic acid, formic acid, salt(s) of tartaric acid, carbodiamides, biguanides, di-cyan di-amide, calcium carbonate, thio urea, urea, semicarbazide, centralite, urethane, diphenyl, diphenylamine, naphthylamine, aminophenol, benzoic acid, pyrocatechin, phenylenediamine, hexamine, $(NH_4)_2C_2O_4 \cdot H_2O$, $NH_4$, LiF, and combinations of these.

In certain preferred embodiments, the stabilizing agent comprises one or more metal salts, including those which can be characterized as deoxidants, particularly metal halides, metal sulfates, metal carbonates, metal nitrates, and mixtures of these. In certain embodiments it is preferred that the metal which forms the metal salt be selected from alkali and alkali earth metals, more preferably alkali and alkali earth metals from Period 3 or Period 4 of the periodic table, and even more particularly potassium, magnesium, calcium and combinations of these. Particularly preferred are potassium halides (particularly KCl), $MgSO_4$, $CaCO_3$, $MgCO_3$, dolomite $(CaMgCO_3)$, $Mg(NO_3)_2$, and combinations of two or more of these. Applicants have found that in certain preferred embodiments the group from which the stabilizer is selected does not include lithium halides, and particularly lithium fluoride.

In certain preferred embodiments, the stabilizing agent comprises one or more of thiourea, silicon oxides (including particularly $SiO_2$), ammonium salts (including particularly ammonium tartarate, ammonium oxalate, ammonium sulfamate and combinations of these, but in certain preferred embodiments excluding ammonium benzoate), and combinations of these. Applicants have found that in certain preferred embodiments the group from which the stabilizer is selected does not include urea, biphenyl, diphenylamine, 2-aminophthalene, 4-aminophenol, 1,3-diethyl-1,3-diphenylurea, hexamethylene tetramine, ammonium benzoate, 1,4-phenylenediamine, ureathane, or catecol.

Although it is also contemplated that the particular amount of stabilizing agent used in any particular composition may vary widely, depending upon numerous factors including the particular components used in the composition, it is generally preferred that stabilizing agent of the present invention is present in the composition in an amount of from about 0.1 wt. % to about 20 wt. %, more preferably from about 0.1 wt. % to about 10 wt. % of the composition, and even more preferably from about 0.1 wt. % to about 2 wt %.

Another aspect of the present invention relates to a composition, and preferably a fertilizer, comprising ammonium nitrate in combination with at least a third compound selected from the group consisting of ammonium sulfate, ammonium phosphate, calcium nitrate, potassium nitrate, magnesium nitrate, ammonium molybdenate, ammonium hexafolouralsilicate, neodymium hydroxynitrate, and combinations of two or more of these. In preferred embodiments, said combination of ammonium nitrate and said at least a third compound comprises a double salt of ammonium nitrate and at least one of said third compounds. In certain preferred embodiments the third component is a double salt selected from ammonium potassium nitrate, ammonium phosphate nitrate, and combinations of these. In certain preferred embodiments the group from which the third component is selected does not include calcium ammonium nitrate, or ammonium mon-hydrogen phosphate nitrate. It is contemplated that the third component may be present in widely ranging amounts within the scope of the present invention. In preferred embodiments the third component is present in a molar ratio of from about 0.5:1 to about 2:1, based on ratio of the moles of the third component to the moles of the ammonium nitrate, more preferably from about 0.75:1 to about 1.25:1, and even more preferably about 1:1. The preferred compositions exhibit a reduced sensitivity to detonation relative to compositions consisting essentially of ammonium nitrate.

Another aspect of the present invention relates to methods of handling fertilizer compositions comprising providing a substantially non-detonable fertilizer composition comprising ammonium nitrate in combination with such stabilizing agent, and optionally but preferably also in combination with said at least third compound. In certain preferred embodiments, said third compound is selected from the group consisting of ammonium sulfate, ammonium phosphate, calcium nitrate, potassium nitrate, magnesium nitrate, ammonium molybdenate, ammonium hexaflouralsilicate, neodymium hydroxynitrate, and combinations of two or more of these. In certain preferred embodiments at least a portion, more preferably at least a substantial portion, and even more preferably substantially all of said ammonium nitrate in said composition is present in the form of a double salt with one or more of said second compounds. The present handling methods include methods of transporting fertilizer, methods of storing fertilizer and methods of applying fertilizer to soil or other growing material.

As used herein, the term "ammonium nitrate composition" refers broadly to compositions which contain ammonium nitrate in any form, including as double salt with other compounds.

As used herein, the term "double salt" refers to a salt made up of at least two different types of cations and one type of anion or of at least two different types of anions and one type of cation. Thus, the term "double salt of ammonium nitrate" is understood to mean a combination of ammonium nitrate and another compound in such a way as to form new compound which is crystallocrystaligraphically distinct from either of the constituents.

In certain preferred embodiments the compositions, including certain embodiments involving the fertilizers and other materials of the present invention, the compositions have a relatively low concentration of single salt AN. As used herein the term "single AN" refers to a salt in which substantially all of the cations are ammonium and substantially all of the anions are nitrate. In certain highly preferred embodiments the compositions and materials of the present invention have no substantial amount of single salt AN, and in certain embodiments the compositions contain not more than trace amounts of single salt AN.

Preferably the present compositions, particularly in the form of fertilizers and when used in connection with methods involving handling the fertilizers, are not considered hazardous materials under Title 49 of the Code of Federal Regulations, "Transportation", Part 172, "Hazardous Materials Table", Oct. 1, 2000, and are also preferably not classified as oxidizers under United Nations Recommendations on the Transport of Dangerous Goods, Manual of Tests and Criteria, 1995", "Section 34, Classification Procedures, Test Methods and Criteria Relating to Oxidizing Substances of Division 5.1".

One aspect of the present invention provides compositions preferably having desirable agricultural properties, such as would be required for fertilizers and the like, and a high detonation resistance in comparison to single salt AN. In preferred embodiments, the present invention provides fertilizer compositions comprising one or more double salts of the formula (I):

$$(M).n(NH_4NO_3).m(H_2O) \quad (I)$$

where M is a cation-anion pair selected from the group consisting of ammonium phosphate, calcium nitrate, potassium nitrate, magnesium nitrate, ammonium molybdenate, ammonium hexaflouralsilicate and neodymium hydroxynitrate, n is from about 0.2 to about 3, and m is from about 0 to about 10.

In preferred embodiments the present compositions are characterized as being comprised of, and preferably consisting essentially of, components (preferably double salts) that are low exotherm components and/or that are resistant to cohesion loss.

It is also preferred in many embodiments that the present compositions are characterized as being comprised of, and preferably consisting essentially of, components, and particularly double salts, that exhibit a cohesive stability temperature of at least about 500° K, and even more preferably at least about 600° K. As used herein, cohesion stability temperature refers to the temperature at which the components of the double salt begin to show significant loss of cohesion. It is also preferred that the present compositions are characterized as being comprised of, and preferably consisting essentially of, components, and particularly double salts, that exhibit higher cohesion stability than that of ammonium nitrate, where the cohesive stability difference is determined by comparison of the cohesive exotherms of the compound of formula (I) to that of single salt ammonium nitrate. In a preferred embodiment, the improvement in cohesion stability is a two-fold increase in stability compared to single salt ammonium nitrate. As used herein, cohesive exotherm means the thermodynamic free energy released as the bulk material represented by $[(M).n(NH_4NO_3).m(H_2O)]_n$ (II), decomposes to the compositional parts represented by Formula (I) and where a cohesively unstable compound has a negative value of free energy and a more stable compound has a positive value at a temperature of about 600° K. Preferably, the cohesive exotherm of the preferred double salts of the present invention, as used in the present composition and fertilizers, is substantially greater than about the cohesive exotherm of single salt AN, and even more preferably is substantially greater than about the cohesive exotherm of the 3:1 ASN double salt Preferably the present compositions contain a combined total of $(NH_4)_2SO_4.3(NH_4NO_3)$ double salt and ammonium nitrate $(NH_4NO_3)$ of from about 0 to about 3 wt. %, and more preferably the ammonium nitrate is present in any amount of from about 0 to 1 wt. % of the composition, and even more preferably in not more than a trace amount.

EXAMPLES

The following examples are illustrative of certain embodiments of the invention but are not necessarily limiting of the broad scope thereof.

Examples 1A and 1B

Metal Salt Stabilizers

Several compositions are prepared. Each composition is prepared by combining into a substantially homogeneous composition about 99.5 wt % 1:2 ammonium sulfate nitrate and about 0.5 wt % of a stabilizing agent. Each stabilizing agent consisted of the compound indicated in Table 1 below. Each composition is then tested for onset temperature and DTA in accordance with the procedures indicated above. In addition, weight loss in the composition is monitored and reported. Weight loss is an indicator of the occurrence of a reaction.

TABLE 1

| Sample | Stabilizing Agent | Onset Temperature (C.) | Weight Loss (wt. %) | DTA (uV) |
|--------|-------------------|------------------------|---------------------|----------|
| A      | CaCO3             | 223.0                  | 39.6                | −0.10    |
| B      | LiF               | 219.7                  | 38.8                | 0.90     |

As can be seen from the above results, the use of $CaCO_3$ and LiF as a stabilizing agent in an amount of about 0.5 weight % produces a DTA of less than about 1.0 uV, which is not preferred in certain embodiments of the present invention. Also, LiF produces an onset temperature that less than certain preferred embodiments of the present invention.

Examples 2A-2D

Metal Salt Stabilizers

Several compositions are prepared. Each composition is prepared by combining into a substantially homogeneous composition about 99.5 wt % 1:2 ammonium sulfate nitrate and about 0.5 wt % of a stabilizing agent. Each stabilizing agent consisted of the compound indicated in Table 2 below (note that evaluation of sample B was repeated). Each composition is then tested for onset temperature and DTA in accordance with the procedures indicated above. In addition, weight loss in the composition is monitored and reported. Weight loss is an indicator of the occurrence of a reaction.

TABLE 2

| Sample | Stabilizing Agent | Onset Temperature (C.) | Weight Loss (wt. %) | DTA (uV) |
|---|---|---|---|---|
| A | KCl | 222.5 | 37.4 | 2.00 |
| B1 | $MgSO_4$ | 222.9 | 40.0 | 2.70 |
| B2 | $MgSO_4$ | 222.7 | 39.4 | 2.25 |
| C | Dolomite (CaMgCO3) | 222.5 | 39.2 | 2.70 |
| D | $Mg(NO3)_2$ | 222.0 | 40.4 | 3.18 |

As can be seen from the above results, the use of each of the compounds in Table 2 as a stabilizing agent in an amount of about 0.5 weight % produces a DTA of greater than 1 and onset temperature above about 200° C., which is in accordance with certain preferred embodiments of the present invention.

Examples 3A-3K

Amide and Ammonium Stabilizers

Several compositions are prepared. Each composition is prepared by combining into a substantially homogeneous composition about 99.5 wt % 1:2 ammonium sulfate nitrate and about 0.5 wt % of a stabilizing agent. Each stabilizing agent consisted of the compound indicated in Table 3 below. Each composition is then tested for onset temperature and DTA in accordance with the procedures indicated above. In addition, weight loss in the composition is monitored and reported. Weight loss is an indicator of the occurrence of a reaction.

TABLE 3

| Sample | Stabilizing Agent | Onset Temperature (C.) | Weight Loss (wt. %) | DTA (uV) |
|---|---|---|---|---|
| A | Urea | 223.8 | 39.6 | 0.73 |
| B | Biphenyl | 222.1 | 39.2 | 0.30 |
| C | Diphenylamine | 220.7 | 39.5 | −1.64 |
| D | 2-aminophthalene | 222.4 | 38.5 | −0.46 |
| E | 4-aminophenol | 218.1 | 38.3 | −0.40 |
| F | 1,3-diethyl-1,3-diphenylurea | 223.2 | 39.2 | 0.39 |
| G | Hexamethylene tetramine | 221.7 | 40.7 | −0.31 |
| H | ammonium benzoate | 222.5 | 37.8 | 0.91 |
| I | 1,4-phenylenediamine | 219.7 | 38.0 | 0.96 |
| J | Ureathane | 217.1 | 38.3 | 1.11 |
| K | Catecol | 215.2 | 39.7 | −2.21 |

As can be seen from the above results, the use of the compounds in Table 3 as a stabilizing agent in an amount of about 0.5 weight % produces a DTA of less than about 1.0, which is not preferred in certain embodiments of the present invention. Also, 4-aminophenol produces an onset temperature that less than certain preferred embodiments of the present invention.

Examples 4A-4E

Amide and Ammonium Stabilizers

Several compositions are prepared. Each composition is prepared by combining into a substantially homogeneous composition about 99.5 wt % 1:2 ammonium sulfate nitrate and about 0.5 wt % of a stabilizing agent. Each stabilizing agent consisted of the compound indicated in Table 4 below. Each composition is then tested for onset temperature and DTA in accordance with the procedures indicated above. In addition, weight loss in the composition is monitored and reported. Weight loss is an indicator of the occurrence of a reaction.

TABLE 4

| Sample | Stabilizing Agent | Onset Temperature (C.) | Weight Loss (wt. %) | DTA (uV) |
|---|---|---|---|---|
| A | Thiourea | 223.7 | 37.3 | 1.63 |
| B | Ammonium Tartrate | 221.5 | 39.6 | 1.87 |
| C | SiO2 | 225.6 | 37.9 | 1.05 |
| D | ammonium oxalate | 223.9 | 40.8 | 2.14 |
| E | ammonium sulfamate | 223.3 | 40.7 | 2.13 |

As can be seen from the above results, the use of each of the compounds in Table 4 as a stabilizing agent in an amount of about 0.5 weight % produces a DTA of greater than 1 and onset temperature above about 200° C., which is in accordance with certain preferred embodiments of the present invention.

It will be appreciated by those killed in the art that various modifications and changes to the particular embodiments described herein can be made based upon the overall teachings contained herein, and that the scope of the invention should not be considered limited in any way except as defined in the following claims.

What is claimed is:
1. A fertilizer composition comprising:
   a double salt that includes ammonium nitrate and a compound selected from the group consisting of ammonium sulfate, ammonium phosphate, calcium nitrate, potassium nitrate, magnesium nitrate, ammonium molybdenate, ammonium hexaflouralsilicate, neodymium hydroxynitrate, and combinations of two or more thereof; and
   at least one stabilizing agent selected from the group consisting of deoxidants and ammonium generating agents.
2. The fertilizer composition of claim 1, wherein the at least one stabilizing agent is present in an amount of from about 0.1 wt % to about 20 wt %.
3. The fertilizer composition of claim 1, wherein the at least one stabilizing agent is present in an amount of from about 0.1 wt % to about 10 wt %.
4. The fertilizer composition of claim 1, wherein the at least one stabilizing agent is present in an amount effective to substantially reduce the detonation sensitivity of the composition relative to the detonation sensitivity of 2:1 ASN.
5. The fertilizer composition of claim 1, wherein the at least one stabilizing agent is present in an amount of from about 0.1 wt % to about 2 wt %.

6. The fertilizer composition of claim 1, wherein the at least one stabilizing agent comprises one or more metal salts, wherein the metal that forms the metal salt is selected from the group consisting of alkali metals from Period 3 or Period 4 of the periodic table and alkali earth metals from Period 3 or Period 4 of the periodic table.

7. The fertilizer composition of claim 6, wherein the metal that forms the metal salt is selected from the group consisting of potassium, magnesium, calcium or combinations thereof.

8. The fertilizer composition of claim 7, wherein the one or more metal salts is selected from the group consisting of KCl, $MgSO_4$, $CaCO_3$, $MgCO_3$, dolomite ($CaMgCO_3$), $Mg(NO_3)_2$, and combinations of two or more thereof of these.

9. The fertilizer composition of claim 1, wherein the at least one stabilizing agent comprises at least one metal salt selected from the group consisting of metal halides, metal sulfates, metal, carbonates, metal nitrates, and mixtures thereof.

10. The fertilizer composition of claim 1 wherein the at least one stabilizing agent comprises at least one metal halide.

11. The fertilizer composition of claim 1 wherein the at least one stabilizing agent comprises at least one metal sulfate.

12. The fertilizer composition of claim 1 wherein the at least one stabilizing agent comprises at least one metal carbonate.

13. The fertilizer composition of claim 1 wherein the at least one stabilizing agent comprises at least one metal nitrate.

14. The fertilizer composition of claim 1, wherein the at least one stabilizing agent is selected from the group consisting of active silica, magnesium nitrate, magnesium sulfate, potassium chloride, calcium carbonate, magnesium carbonate, water, dolomite, oxalic acid, formic acid, salts of tartaric acid, carbodiamides, biguanides, di-cyan di-amide, calcium carbonate, thio urea, urea, semicarbazide, centralite, urethane, diphenyl, diphenylamine, naphthylamine, aminophenol, benzoic acid, pyrocatechin, phenylenediamine hexamine, $(NH_4)_2C_2O_4$—$H_2O$, $NH_4$, LiF, and combinations thereof of these.

15. The fertilizer composition of claim 1, wherein the at least one stabilizing agent is selected from the group consisting of thiourea, silicon oxides, ammonium salts, and combinations of two or more thereof.

16. The fertilizer composition of claim 1, wherein the at least one stabilizing agent comprises $SiO_2$.

17. The fertilizer composition of claim 1, wherein the composition has a single salt ammonium nitrate composition of about 0 to 1 wt. %, based on the total weight of the composition.

18. The fertilizer composition of claim 1, wherein the double salt that includes ammonium nitrate and a compound selected from the group consisting of ammonium phosphate, potassium nitrate, magnesium nitrate, ammonium molybdenate, ammonium hexaflouralsilicate, neodymium hydroxynitrate, and combinations of two or more thereof.

19. A method of forming a fertilizer composition comprising the step of combining:
   a first composition comprising a double salt that includes ammonium nitrate and a compound selected from the group consisting of ammonium sulfate, ammonium phosphate, calcium nitrate, potassium nitrate, magnesium nitrate, ammonium molybdenate, ammonium hexaflouralsilicate, neodymium hydroxynitrate, and combinations of two or more thereof; and
   a second composition including at least one stabilizing agent selected from the group consisting of deoxidants and ammonium generating agents.

20. The method of claim 19, wherein the combined fertilizer composition has a single salt ammonium nitrate composition of about 0 to 1 wt. %, based on the total weight of the composition.

* * * * *